US012699928B2

(12) United States Patent
Ren et al.

(10) Patent No.: US 12,699,928 B2
(45) Date of Patent: Aug. 4, 2026

(54) METHODS AND DEVICES FOR LOSSLESS SWITCHING BETWEEN MULTIPLE PARAMETER SETS FOR SERVING MODEL

(71) Applicant: KWAI INC., Palo Alto, CA (US)

(72) Inventors: Yongxiong Ren, San Jose, CA (US); Yang Liu, San Jose, CA (US); Lingzhi Liu, San Jose, CA (US)

(73) Assignee: BEIJING TRANSTREAMS TECHNOLOGY CO. LTD., Beijing (CN)

( * ) Notice: Subject to any disclaimer, the term of this patent is extended or adjusted under 35 U.S.C. 154(b) by 641 days.

(21) Appl. No.: 18/139,305

(22) Filed: Apr. 25, 2023

(65) Prior Publication Data

US 2024/0362519 A1    Oct. 31, 2024

(51) Int. Cl.
| | |
|---|---|
| *G06N 5/00* | (2023.01) |
| *G06N 5/04* | (2023.01) |
| *G06N 20/00* | (2019.01) |

(52) U.S. Cl.
CPC .............. *G06N 20/00* (2019.01); *G06N 5/04* (2013.01)

(58) Field of Classification Search
CPC .......... G06N 20/00; G06N 20/20; G06N 5/04; G06N 3/063; G06N 5/00; G06N 20/10; G06F 9/5038; G06F 9/4843; G06F 2209/548; G06T 1/60; G06T 1/20
See application file for complete search history.

(56) References Cited

U.S. PATENT DOCUMENTS

| | | | | |
|---|---|---|---|---|
| 11,500,871 | B1 * | 11/2022 | Kulkarni ................ | G06N 20/00 |
| 11,615,347 | B2 * | 3/2023 | Liu ..................... | G06F 11/3466 |
| | | | | 706/12 |
| 12,124,961 | B2 * | 10/2024 | O'Donncha ........... | G06N 3/088 |
| 2018/0099760 | A1 * | 4/2018 | Paul ........................ | G06F 30/20 |
| 2022/0147516 | A1 * | 5/2022 | Tang ...................... | G06N 20/00 |
| 2023/0111375 | A1 * | 4/2023 | Clemons .................. | G06N 3/08 |
| | | | | 706/15 |
| 2023/0145208 | A1 * | 5/2023 | Bobu ..................... | G06N 20/00 |
| | | | | 706/12 |

FOREIGN PATENT DOCUMENTS

| | | | | |
|---|---|---|---|---|
| WO | WO-2019165248 A1 * | 8/2019 | ............ | G06F 30/23 |

OTHER PUBLICATIONS

D. Jia, G. Yuan, X. Lin and N. Mi, "A Data-Loader Tunable Knob to Shorten GPU Idleness for Distributed Deep Learning," 2022 IEEE 15th International Conference on Cloud Computing (CLOUD), Barcelona, Spain, 2022, pp. 449-458.*

(Continued)

*Primary Examiner* — Pierre Michel Bataille
(74) *Attorney, Agent, or Firm* — Arch & Lake LLP

(57) ABSTRACT

A method for processing data in a multi-mode single-engine system, an apparatus, and a non-transitory computer-readable storage medium are provided. In the method, a graphic processing engine receives a first input query. Further, the graphic processing engine obtains a first set of model parameters by switching between multiple sets of model parameters based on the first input query. Moreover, the graphic processing engine infers a first output for the first input query based on the first set of parameters.

20 Claims, 8 Drawing Sheets

| | |
|---|---|
| A graphic processing engine receives a first input query | <u>601</u> |

| | |
|---|---|
| The graphic processing engine obtains a first set of model parameters by switching between multiple sets of model parameters based on the first input query | <u>602</u> |

| | |
|---|---|
| The graphic processing engine infers a first output for the first input query based on the plurality of first set of model parameters | <u>603</u> |

(56) References Cited

OTHER PUBLICATIONS

Mohamed Zaghloul, Mofreh Salem, Amr Ali-Eldin, "A new framework based on features modeling and ensemble learning to predict query performance," https://pmc.ncbi.nlm.nih.gov/articles/PMC8523072/, Oct. 18, 2021.*

"Machine-Learning for Optimization of Software Parameters," IP.com Prior Art Database Technical Disclosure, Dec. 13, 2017.*

R. Tan, R. Chirkova, V. Gadepally and T. G. Mattson, "Enabling query processing across heterogeneous data models: A survey," 2017 IEEE International Conference on Big Data (Big Data), Boston, MA, USA, 2017, pp. 3211-3220.*

* cited by examiner

Multi-Mode Multi-Engine
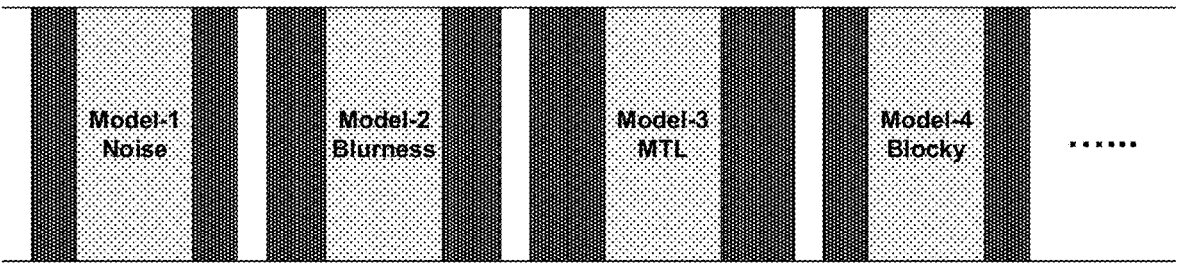
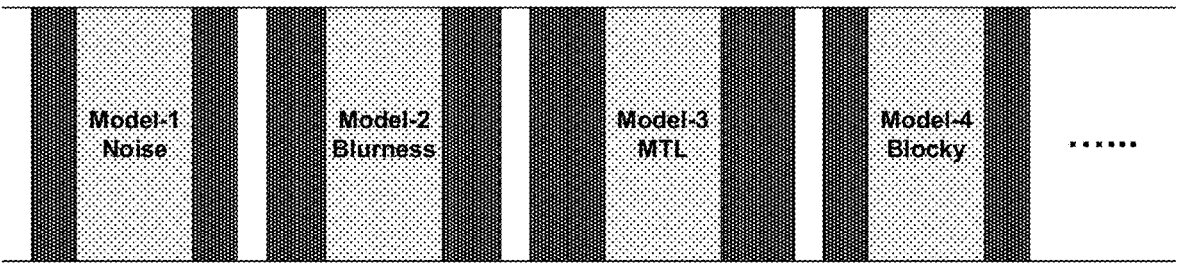            weights + activation memory
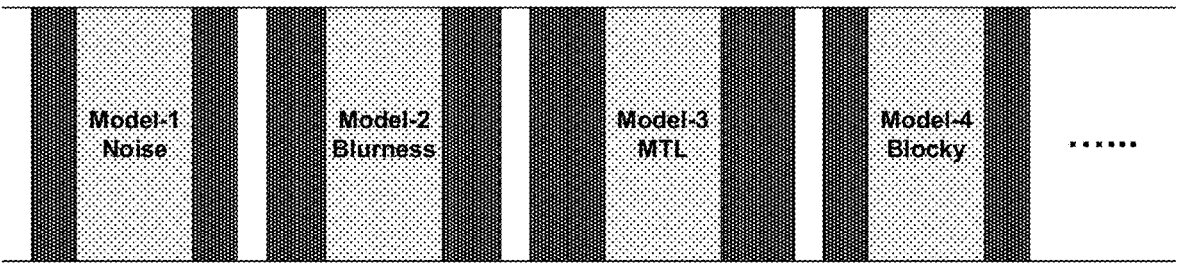            TensorRT engine memory
FIG. 1A
Multi-Mode Single-Engine
Model-1
Noise | Model-2
Blurness | Model-3
MTL | Model-4
Blocky | ......
weights + activation memory
TensorRT engine memory
FIG. 1B

| A graphic processing engine receives a first input query | 601 |

The graphic processing engine obtains a first set of model parameters by switching between multiple sets of model parameters based on the first input query        602

The graphic processing engine infers a first output for the first input query based on the plurality of first set of model parameters        603

METHODS AND DEVICES FOR LOSSLESS SWITCHING BETWEEN MULTIPLE PARAMETER SETS FOR SERVING MODEL

FIELD

The present application generally relates to artificial intelligence model deployment, and in particular but not limited to, to lossless switching between multiple parameter sets for serving models deployed on a single engine.

BACKGROUND

In most artificial intelligence (AI) applications, the inference of a deep learning model during serving employs only one set of weight parameters which remains unchanged unless another checkpoint obtained from model training are ready for substitution. As such, the inference engine is bound with weight parameters which only require to be loaded into the memory of hardware devices once prior to serving. However, there exist scenarios where model weight parameters need to be dynamically switched according to specific input configurations or features, such as input categories. For example, when input queries belong to eight categories and each category corresponds to one set of model parameters, eight sets of weight parameters are switched on-the-fly during serving. This is equivalent to the case that each category corresponds to one different model and all eight models share the same neural network architecture but have different model weights.

It is quite challenging to switch either weights or models based on inputs without degradation in throughput and latency. One unsophisticated implementation is to generate multiple inference engines and reload model weights or relaunch engines on-the-fly according the input, each of which would incur significant time overhead given that frequent data movement, kernel launching or initialization are all expensive. Consequently, the throughput (latency) may reduce (increase) by orders of magnitude compared to serving a model with a single set of weight parameters.

SUMMARY

The present disclosure provides examples of techniques relating to lossless switching between multiple parameter sets for serving models deployed on a single engine.

According to a first aspect of the present disclosure, there is provided a method for processing data in a multi-model single-engine (MMSE) system. In the method, a graphic processing engine in the MMSE system may receive a first input query. Furthermore, the graphic processing engine may obtain a first set of model parameters by switching between multiple sets of model parameters based on the first input query. Moreover, the graphic processing engine may infer a first output for the first input query based on the first set of model parameters.

According to a second aspect of the present disclosure, there is provided an apparatus for processing data. The apparatus includes one or more processors and a memory coupled to the one or more processors and configured to store instructions executable by the one or more processors. Furthermore, the one or more processors, upon execution of the instructions, are configured to receive, by a graphic processing engine in the one or more computer processors, a first input query. Moreover, the one or more processors are further configured to obtain a first set of model parameters by switching between multiple sets of model parameters based on the first input query. Further, the one or more processors are further configured to infer a first output for the first input query based on the first set of model parameters.

According to a third aspect of the present disclosure, there is provided a non-transitory computer-readable storage medium. The non-transitory computer-readable storage medium stores computer-executable instructions that, when executed by one or more computer processors, cause the one or more computer processors to perform acts including: receiving, by a graphic processing engine in the one or more computer processors, a first input query; obtain, by the graphic processing engine in the one or more computer processors, a first set of model parameters by switching between multiple sets of model parameters based on the first input query; and inferring, by the graphic processing engine in the one or more computer processors, a first output for the first input query based on the first set of model parameters.

It is to be understood that both the foregoing general description and the following detailed description are exemplary and explanatory only and are not restrictive of the present disclosure.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 1A is a schematic diagram illustrating an example of structure for multi-mode multi-engine.

FIG. 1B is a schematic diagram illustrating an example of structure for multi-mode single-engine in accordance with one or more examples of the present disclosure.

DETAILED DESCRIPTION

Figure 2:
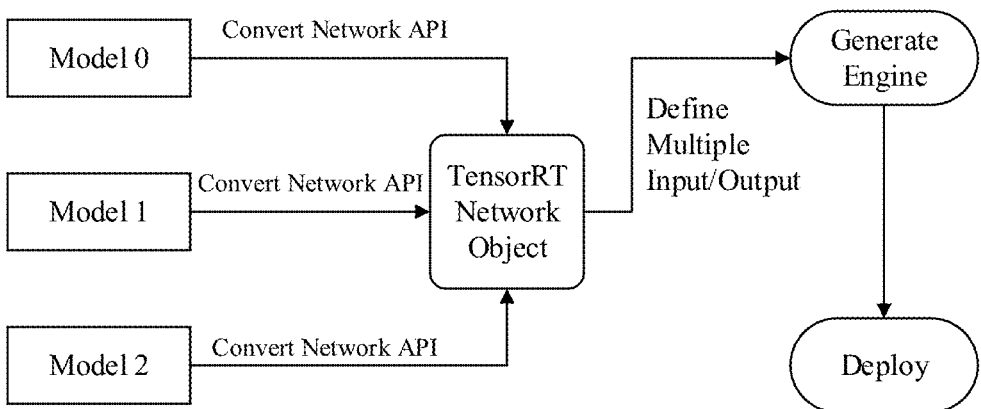
FIG. 2 is a diagram showing parallel execution of all models deployed on one single engine in accordance with some examples of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," and etc. are all used as nomenclature only for references to relevant elements, e.g., devices, components, compositions, steps, and etc., without implying any spatial or chronological orders, unless expressly specified otherwise. For example, a "first device" and a "second device" may refer to two separately formed devices, or two parts, components or operational states of a same device, and may be named arbitrarily.

As used herein, the term "if" or "when" may be understood to mean "upon" or "in response to" depending on the context. These terms, if appear in a claim, may not indicate that the relevant limitations or features are conditional or optional.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

It may be regards as one of the best practices now to have several AI models concurrently serving on a single heterogeneous hardware to maximize the computing potential of the respected hardware for throughput-oriented AI Applications. However, without proper scheduling mechanisms, having multiple AI execution engines deployed on single heterogeneous hardware often leads to chaos. There are several issues raised by this deployment method, and one of the many could be memory inefficiently. Since each model is unaware of the other models running on the same hardware, there is no way for models to share the common memory space such as in/output buffer, buffer memory, scratch memory, etc. This deployment method leads to a waste of rather precious device memory space. Another major problem would be computing competency, which happens when multiple engines get the request at approximately the same time. These engines immediately start calculating and could lead to frequent on-device job switching, which in turn leads to a waste of the total computing power of the heterogeneous device.

CUDA is a general purpose parallel computing platform and programming model that leverages the parallel compute engine in NVIDIA GPUs to solve many complex computational problems in a more efficient way than on a CPU. Launching work on the GPU typically involves copying data over to previously allocated regions in GPU memory, running a CUDA kernel that operates on that data, and then copying the results back from GPU memory into system memory. A CUDA kernel consists of a hierarchy of thread groups that execute in parallel on the GPUs compute engine.

However, when dealing with a large amount of data, e.g., millions of videos, a large number of AI model requires very high processing power. CPU only servers cannot handle this job efficiently, GPU servers are in great demand because GPUs provide much higher throughput. Furthermore, a single GPU is cheaper than a CPU server for the same job. FIG. 1A is a schematic diagram illustrating an example of structure for multi-mode multi-engine and usage of memory. FIG. 1B is a schematic diagram illustrating an example of structure for multi-mode single-engine and usage of memory in accordance with one or more examples of the present disclosure.

NVIDIA multiple-process service (MPS) application may be a similar application compared to what is disclosed in the present disclosure. However, NVIDIA MPS utilize a server and client architecture for handling multiple job service request and combine all the request into a stream for hardware handling. NVIDIA MPS have no model structure or weight combination methods, nor maintain a queue for each model inference request.

Nvidia MPS utilizes a complicated server, client architecture where client sends all computing jobs to the host process and combine it into a single queue for device processing. There are several drawbacks of this method, including complicated passing schematics from client to server, low availability from single host process, single stream process with no priority ordering.

The present disclosure provides a single-engine serving method that allows lossless switching between multiple model parameters sets. In the provided single-engine serving method, a single engine is employed to accommodate all model parameter sets, each of which is selected internally based on the inputs.

Figure 7:
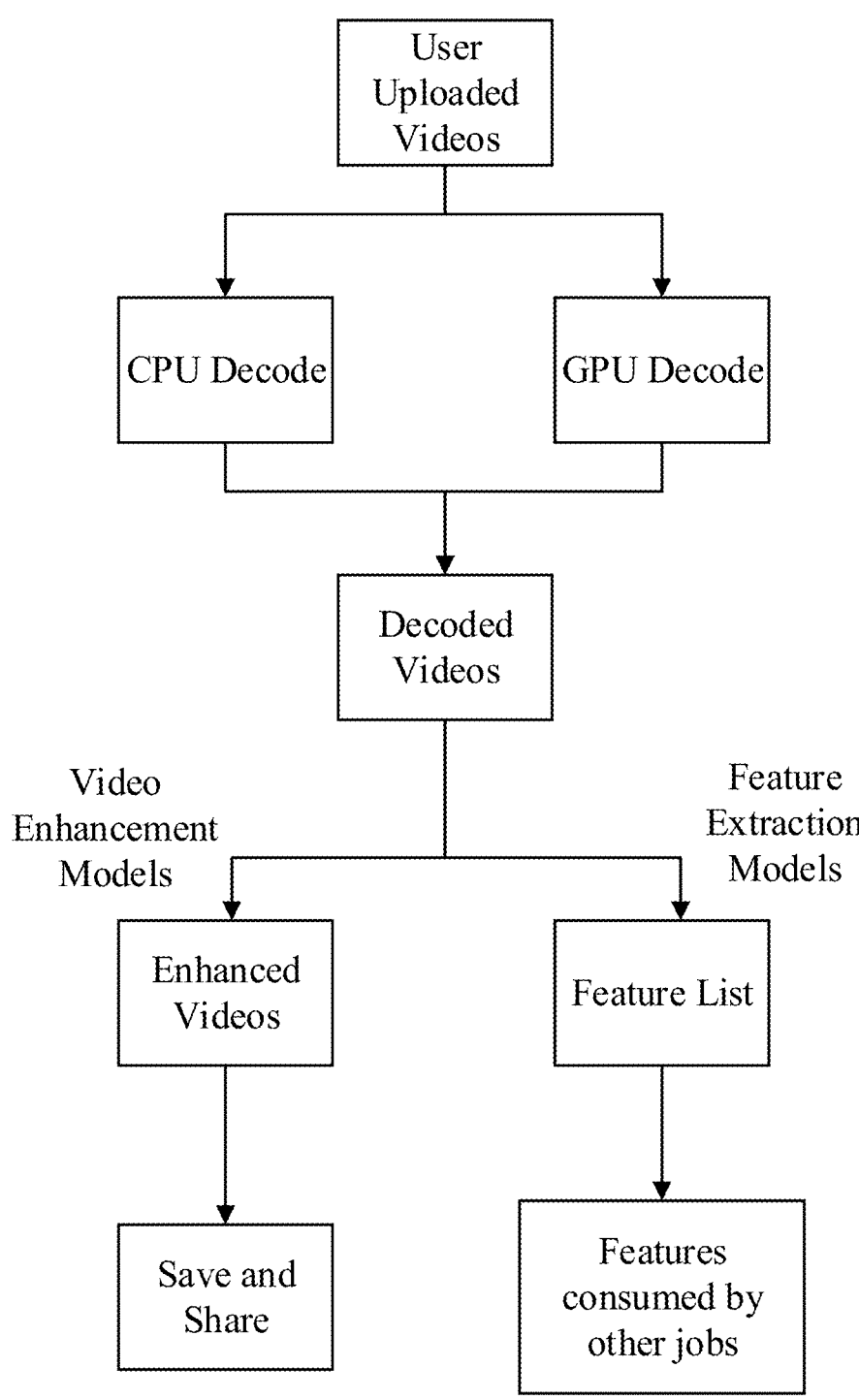
FIG. 7 is a diagram showing processing videos using AI models in accordance with some examples of the present disclosure.

FIG. 7 is a diagram showing processing videos using AI models in accordance with some examples of the present disclosure. In FIG. 7, videos are used as one example for illustration purpose. The single-engine serving method provided according to the present disclosure may be used to process other data, such as images or texts, not limited to videos. Additionally, AI models used in the provided method may include various types of models, including but not limited to, enhancement models, feature extraction models, classification models, regression models, recommendation models, etc.

As shown in FIG. 7, after users upload videos, decoded videos may be obtained through CPU decoding and GPU decoding. All the decoded videos will pass through AI models including enhancement models and feature extraction models. The models used here are not limited to enhancement models and feature extraction models. Enhanced videos may be obtained after the decoded videos pass through the video enhancement models and a feature list may be obtained after the decoded videos pass through the feature extraction models. The feature list may include multiple video feature scores. Furthermore, the enhanced videos may be saved to database for sharing, and features in the feature list may be used by other jobs, such as recommendations.

Figure 8:
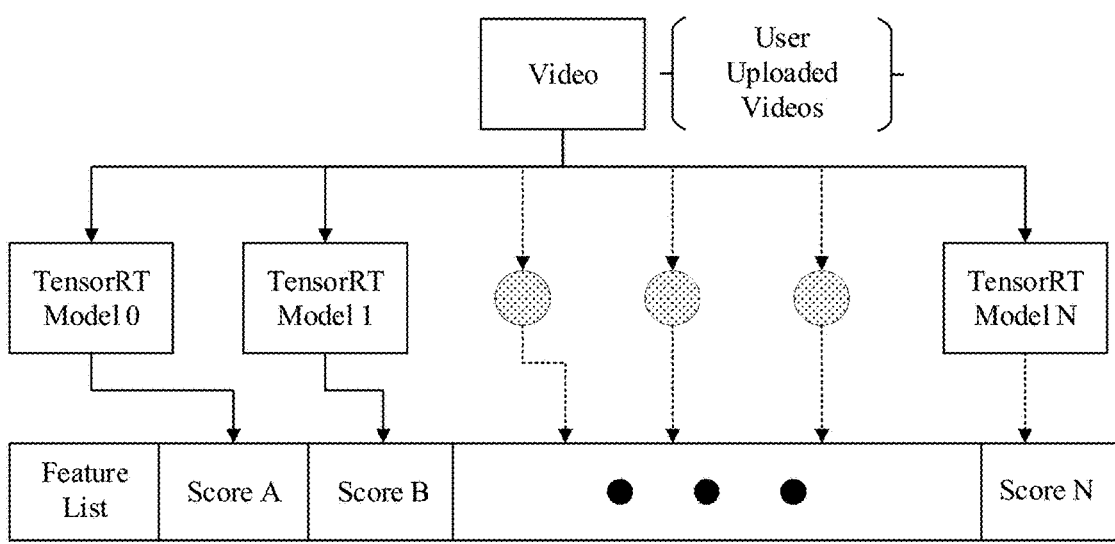
FIG. 8 is a diagram showing an example of video feature extraction models as shown in FIG. 7 in accordance with some examples of the present disclosure.

FIG. 8 is a diagram showing an example of video feature extraction models as shown in FIG. 7 in accordance with some examples of the present disclosure. As shown in FIG. 8, the user uploaded videos may pass through all the video feature extraction models, i.e., Model 0, Model 1, . . . , Model N shown in FIG. 8, where N may be an integer. Each task may have 15 lit models which are mostly CNN networks and similar to Resnet 18. In some examples, Model 0, Model 1, . . . , Model N as shown in FIG. 8 may respectively, but not limited to, TensorRT models where TensorRT is an example of a deep learning inference optimizer for accelerating the inference of deep neural networks on NVIDIA GPUs. Lite models, i.e., lightweight models, are machine learning models that are designed to be compact and efficient, with smaller file sizes and lower computational requirements than their full-size counterparts. Each model in FIG. 8 has its own engine and context and may be preloaded and waiting for new input. All the models in FIG. 8 are deployed on one single GPU.

Figure 9:
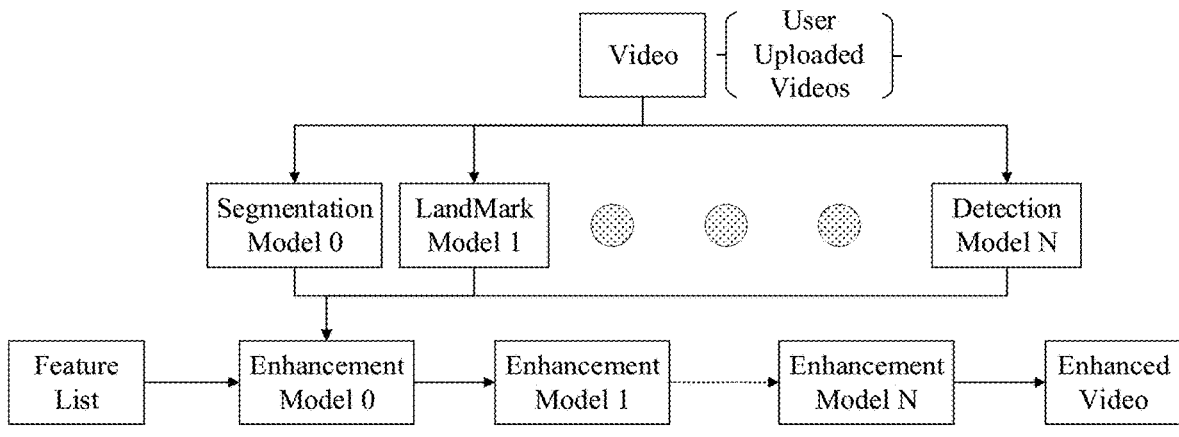
FIG. 9 is a diagram showing an example of video enhancement models as shown in FIG. 7 in accordance with some examples of the present disclosure.

FIG. 9 is a diagram showing an example of video enhancement models as shown in FIG. 7 in accordance with some examples of the present disclosure. As shown in FIG. 9, each video may pass through a set of detection models, i.e., Segmentation Model 0, LandMark Model 1, . . . , Detection Model N as shown in FIG. 9. After passing through the set of detection models, each video then passes through a set of models to further process each video. The set of models may include a set of enhancement models, i.e., enhancement model 0, enhancement model, . . . , enhancement model N, as shown in FIG. 9, and then enhanced video may be generated. The set of models may not be limited to enhancement models as illustrated FIG. 9, and other types of AI models may be used to replace the enhancement models 1-N.

Additionally, the feature list obtained in FIG. 8 may be one of the inputs of the first enhancement model 0 as shown in FIG. 9. All models in FIG. 9 may be heavy and computing intensive models. Each model in FIG. 9 may has its own engine and context and may be preloaded and waiting for new input. In FIG. 9, each set of models may be deployed on one single GPU.

In some examples, in AI model deployment, a trained AI model may be made available for use in a production environment. In other words, AI model deployment involves taking an AI model that has been developed, tested, and trained using data, and making it accessible to end-users or other systems for real-world applications. During a serving phase of an AI application, interference will be used to make predictions or decisions on new input data.

Figure 10:
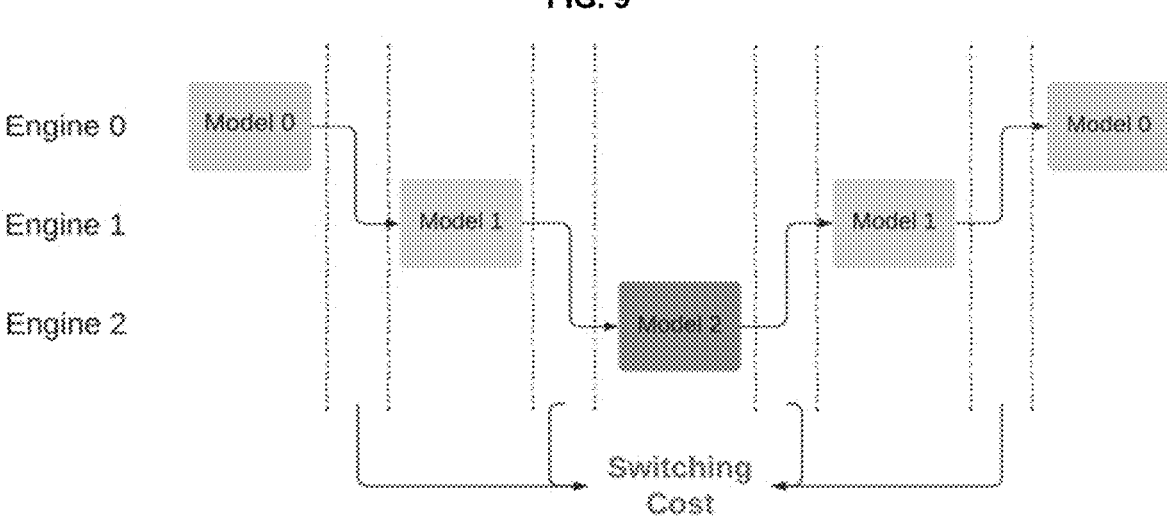
FIG. 10 shows an example of multiple-engine multiple-context deployment method.

FIG. 10 shows an example of multiple-engine multiple-context deployment method. As shown in FIG. 10, Model 0, Model 1, and Model 2 are respectively deployed on different engines, i.e., engine 0, engine 1, and engine 2, which leads to high resources utilization on Memory due to context competing for GPU resources, low computing efficiency, out of order data request from GPU memory, low bandwidth usage, that is, overall low throughput on inference including, but not limited to, video processing AI inference.

Figure 11:
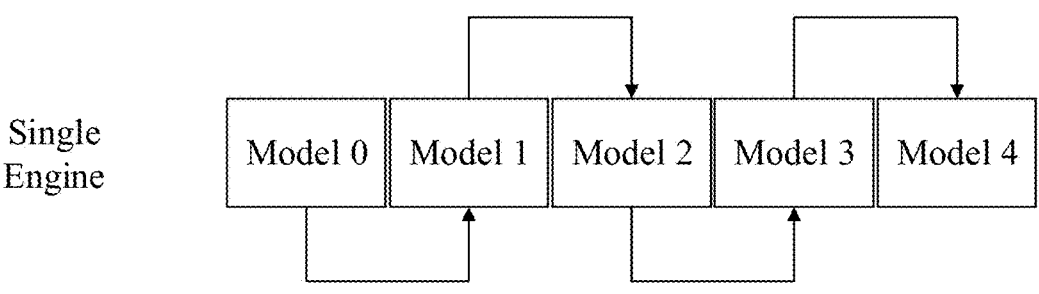
FIG. 11 is a diagram showing a multi-model single-engine method in accordance with some examples of the present disclosure.

FIG. 11 is a diagram showing a multi-model single-engine method in accordance with some examples of the present disclosure. All the models, i.e., Model 0, Model 1, Model 2, Model 3, and Model 4, are combined into one single engine, which only needs one context for all model inference requestion, and thus having no switching cost. Such method is easier to deploy comparing to multiple engines. Additionally, such method can still fully utilize GPU resources by increasing batch and low number concurrent execution.

FIG. 2 is a diagram showing parallel execution of all models deployed on one single engine in accordance with some examples of the present disclosure. As shown in FIG. 11, all models, i.e., Model 0, Model 1, and Model 2, are combined on a network API level, e.g., a TensorRT network API level. A Network Object, e.g., a TensorRT network object, as a kernel selection mechanism, may be created with multiple input/output. Further, a single engine may be generated for deployment.

Figures 12, 13:
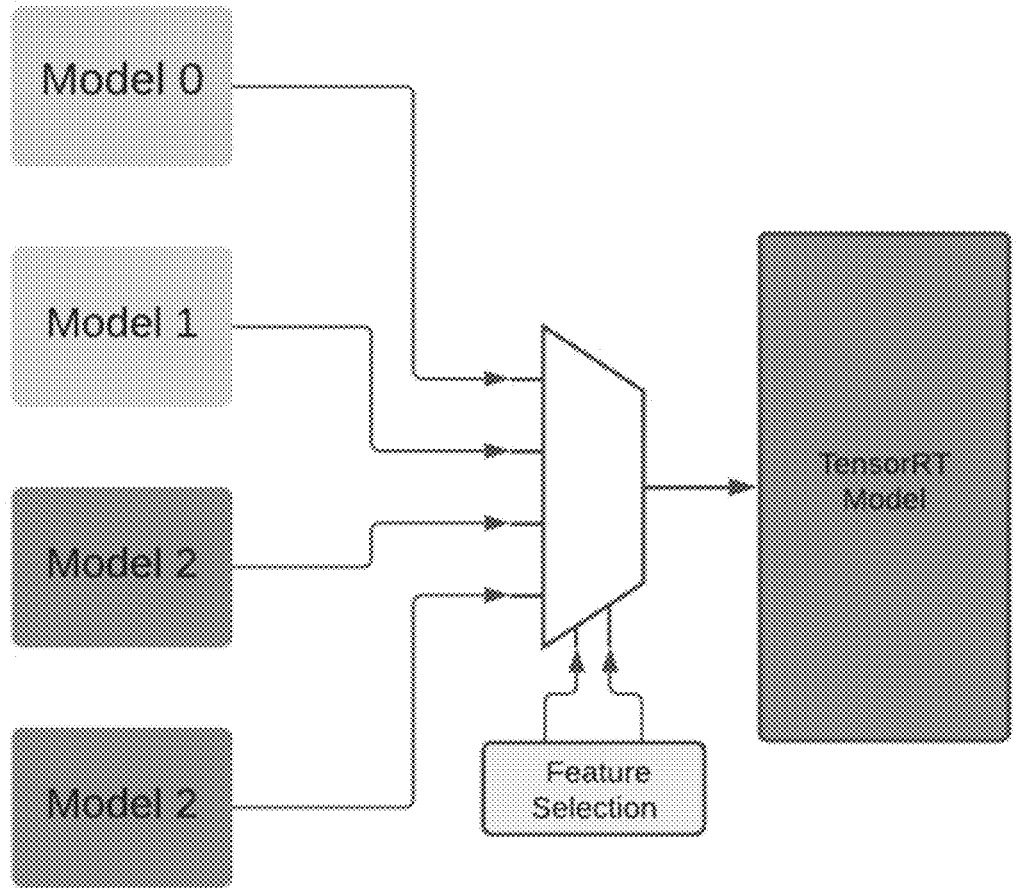
FIG. 12 is a diagram showing a single model structure with multiple sets of weights in accordance with some examples of the present disclosure.
FIG. 13 shows using model weights as one input in the MMSE system in accordance with some examples in the present disclosure.

FIG. 12 is a diagram showing a single model structure with multiple sets of weights in accordance with some examples of the present disclosure. Such structure may be sued in many workloads requiring different model weights targeting different audiences. In such structure, a weight selection mechanism may be needed because as in real time, rebuilding engine is not desirable every time and refitting is not desired since data transfer cost from CPU to GPU is expensive. There is a high demand to use different set of weights with only a pointer change. FIG. 13 shows using model weights as one input in the MMSE system in accordance with some examples in the present disclosure. Plugin based on Cudnn with input data and weights are used as inputs. Engine weights may be preloaded to GPU and set as input to TensorRT engine. Runtime engine weight may be selected by pointer location which requires no complicated logics and weights may be updated easily by changing pointers between each run.

In some examples according to the present disclosure, all sets of weights may be first quantized and compressed using mix-precision quantization and compression techniques to minimize memory footprint and custom kernels that support fast switching of weights are provided. A single engine including all compressed weights may be generated and then launched. The weights may be loaded into hardware device memory only once before actual serving, thus eliminating the overhead for data movement, kernel launching and initialization. Custom kernels which use buffer location of the weights as input parameters are provided to support fast switching of model parameters. Compute kernels may be customized such that each layer kernel can directly read desired weights for that layer. The inference engine with customized kernels may access each layer weight among all weights of all model parameters according to input query and layer index.

Accordingly, this single-engine serving technique is implemented in the GPU servers of a data center and online-serving results show that the provided method according to the present disclosure does not introduce any degradation in service throughput or latency.

Figure 3:
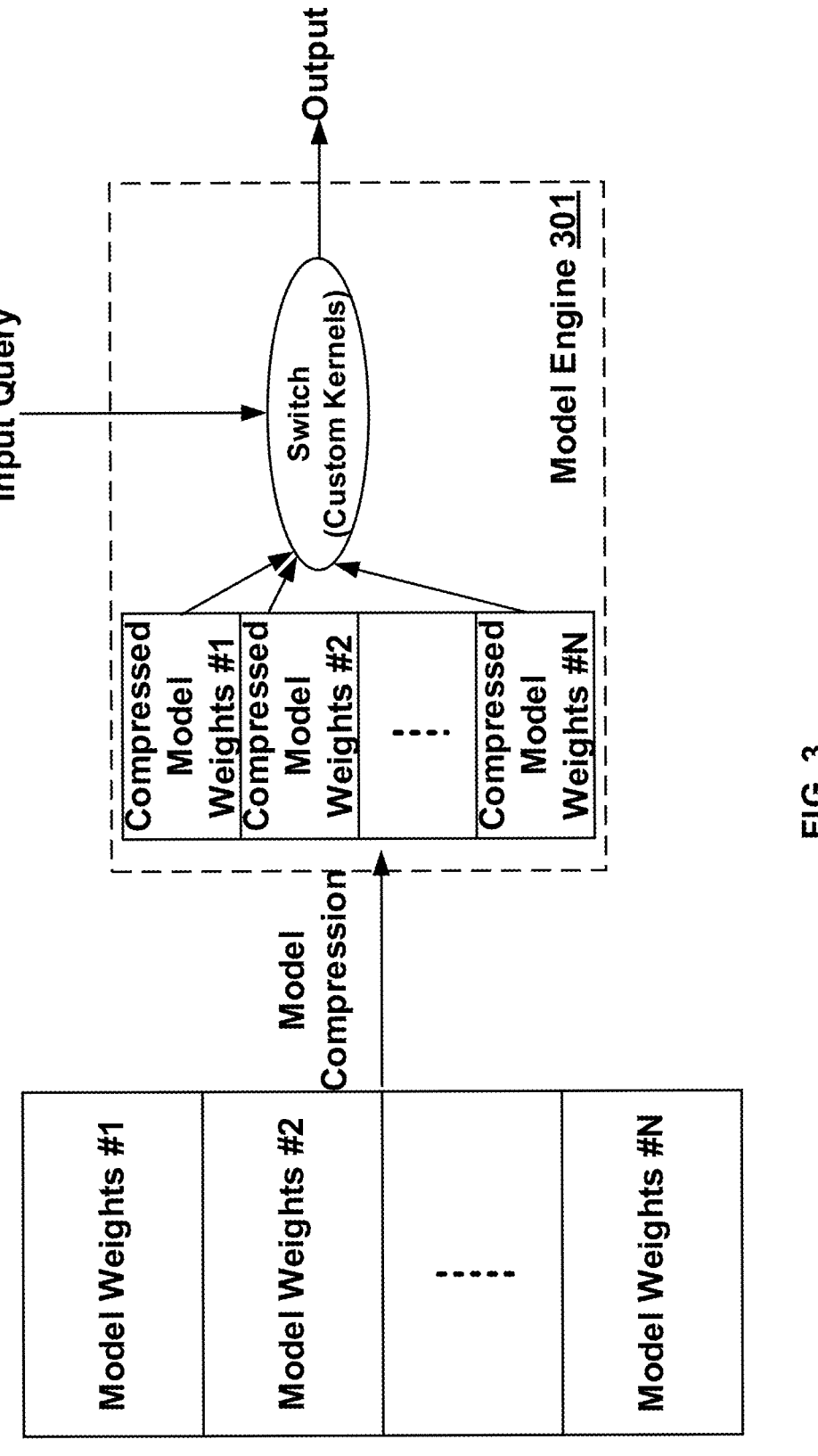
FIG. 3 is a schematic diagram illustrating an example of switching between different model weights in accordance with one or more examples of the present disclosure.

FIG. 3 is a schematic diagram illustrating an example of switching between different model weights in accordance with one or more examples of the present disclosure. As shown in FIG. 3, a single engine, e.g., the model engine 301, rather than multiple engines, is used for application serving. Multiple sets of model parameters, e.g., model weights, such as model weights #1, model weights #2, . . . , and model weights #N, may be first compressed based on mixed-precision quantization, where N may be a positive integer. The model weights #i (i is an integer between 1 and N) may be a set of weights of a particular type, for example, targeting particular audiences. All compressed model weights are then put into a single GPU engine, i.e., the model engine 301. As shown in FIG. 3, the compressed model weights #i may belong to a particular weight set, where i may be an integer between 1 and N. The memory location of each weight set may be pre-determined.

In some examples, customized kernels may be provided to support fast switching of weights by using weight location buffer as input parameters. GPU compute kernels used for each layer (a conventional layer, a fully-connected layer, a recurrent layer, etc.) of a neural network may vary depending on the specific implementation and hardware being used. Compute kernels may be optimized for the particular layer operation and hardware architecture, and may include optimized linear algebra operations such as matrix multiplication, convolution, pooling, activation functions, and more. In some examples, the compute kernels of each layer may directly access the weights according to an input query and a layer index. During serving, the engine may inference using weight parameters at a location determined or indicated by the input query.

Figure 4:
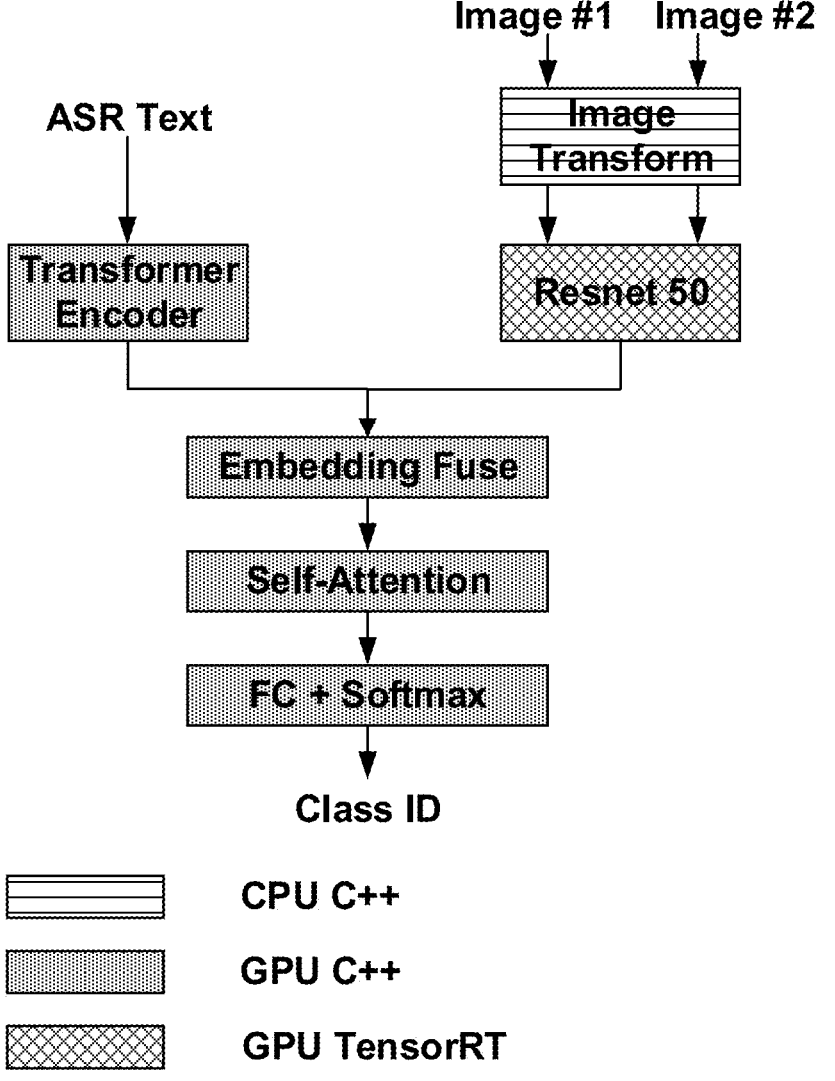
FIG. 4 is a schematic diagram illustrating an example of an application model for video representation learning in accordance with one or more examples of the present disclosure.

FIG. 4 is a schematic diagram illustrating an example of an application model for video representation learning in accordance with one or more examples of the present disclosure. In FIG. 4, a Transformer encoder is used for ASR text embedding and Resnet50 is used for image embedding. The model parameters of the Resnet50 is determined by the category of the input image pair. FIG. 4 shows only one example of applying the method according to the present disclosure on Resnet50 for illustration purpose. The method provided in the present disclosure is not limited to be applied on Resnet50.

In some examples, the whole model of FIG. 4 may be implemented in C++ to generate the inference engine for serving on GPU and all model weight sets may be pre-loaded into GPU memory. In addition to the image pair, the Resnet50 network also takes the input category as the input to specify where the target model parameter set is located on the GPU memory buffer. Compared to the refitting approach by Nvidia TensorRT which is even though easy to implement but requires frequent copy of CPU weights to GPU per query, resulting in severe performance loss, the provided model as shown in FIG. 4 introduces no degradation in throughput and latency.

Figure 5:
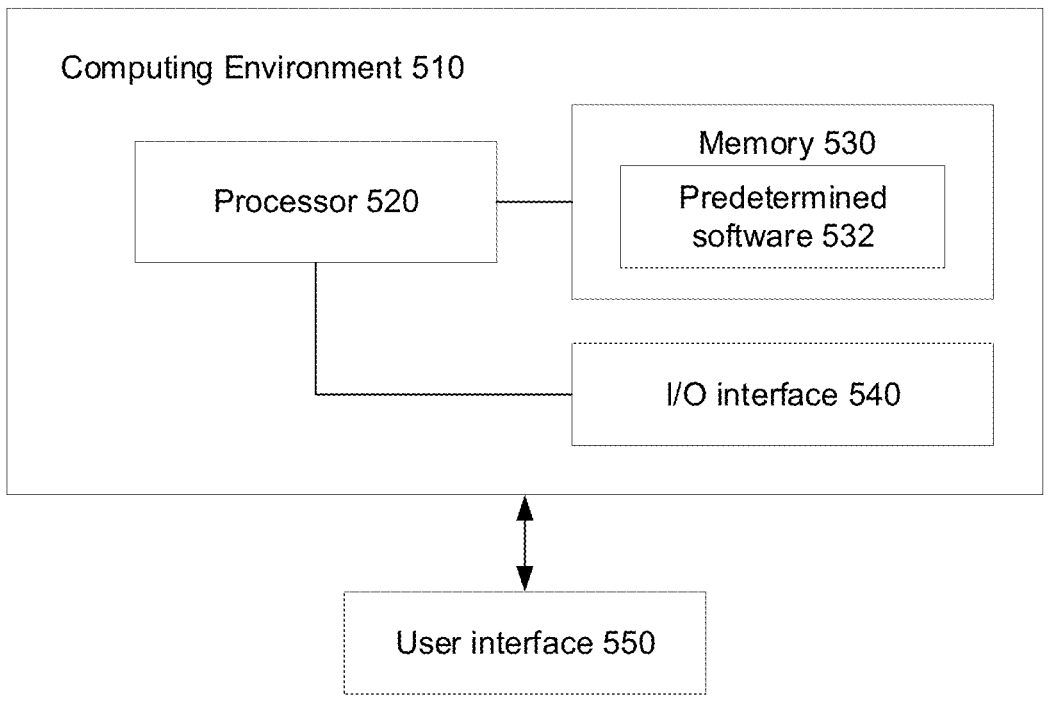
FIG. 5 is a block diagram illustrating an apparatus for processing data in accordance with one or more examples of the present disclosure.

FIG. 5 shows a computing environment or a computing device 510 coupled with a user interface 560. The computing environment 510 can be part of a data processing server. In some embodiments, the computing device 510 can perform any of various methods or processes (such as encoding/decoding methods or processes) as described hereinbefore in accordance with various examples of the present disclosure. The computing environment 510 may include one or more processors 520, a memory 540, and an I/O interface 550.

The one or more processors 520 typically controls overall operations of the computing environment 510, such as the operations associated with the display, data acquisition, data communications, and image processing. The one or more processors 520 may include one or more processors to execute instructions to perform all or some of the steps in the above-described methods. Moreover, the one or more processors 520 may include one or more modules that facilitate the interaction between the one or more processors 520 and other components. The processor may be a Central Processing Unit (CPU), a microprocessor, a single chip machine, a GPU, or the like.

The memory 540 is configured to store various types of data to support the operation of the computing environment 510. Memory 540 may include predetermine software 542. Examples of such data include instructions for any applications or methods operated on the computing environment 510, video datasets, image data, etc. The memory 540 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 550 provides an interface between the one or more processors 520 and peripheral interface modules, such as a keyboard, a click wheel, buttons, and the like. The buttons may include but are not limited to, a home button, a start scan button, and a stop scan button. The I/O interface 550 can be coupled with an encoder and decoder.

In some embodiments, there is also provided a non-transitory computer-readable storage medium including a plurality of programs, such as included in the memory 540, executable by the one or more processors 520 in the computing environment 510, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In some embodiments, the computing environment 510 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

Figure 6:
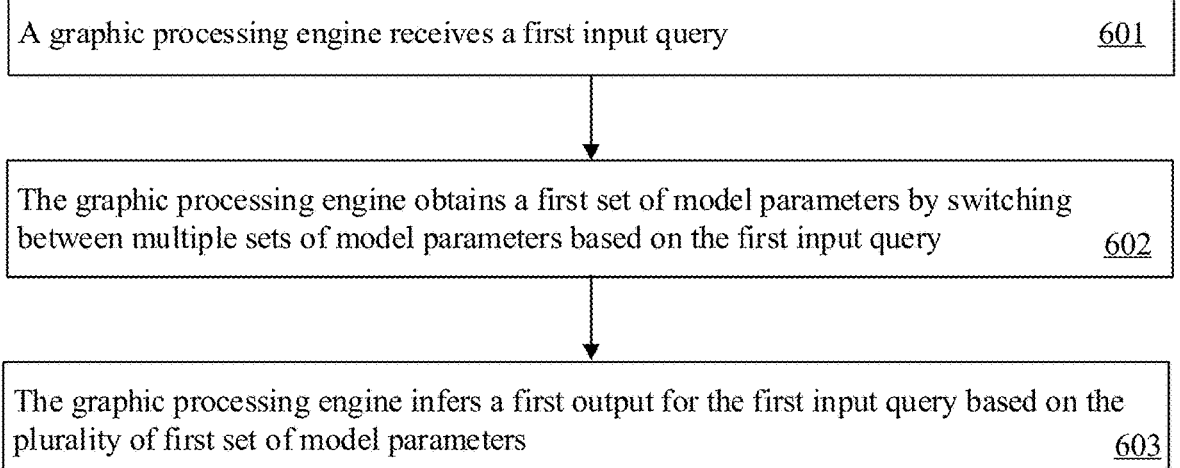
FIG. 6 is a flowchart illustrating a method for processing data in a multi-model single-engine (MMSE) system in accordance with one or more examples of the present disclosure.

FIG. 6 is a flowchart illustrating a method for processing data in a multi-model single-engine (MMSE) system in accordance with one or more examples of the present disclosure.

In step 601, a graphic processing engine in the one or more processors 420 may receive a first input query.

In some examples, the first input query may be associated with a first category, the first input query may include a first category identification, that indicates a first set of model parameters that are obtained by training a plurality of first training data associated with the first category, and the graphic processing engine is in an MMSE system. In some examples, the input query may include multiple fields, one of which is for category identification.

In some examples, the first input query may be one of input queries that are received by the model engine 301 as shown in FIG. 3, and the first category identification may indicate the first set of model parameters, i.e., one set of model weights, e.g., model weights #1 shown in FIG. 3. Each set of model weights may be trained using training data having the first category. For example, the first category is about a group of particular audiences, then the training data may associate with the same group of particular audience. The parameters may include model weights, biases, etc. of a trained AI model.

In step 602, the graphic processing engine may obtain a first set of model parameters by switching between multiple sets of model parameters based on the first input query.

In some examples, the graphic processing engine may access the first set of model parameters from a GPU memory in the graphic processing engine based on the first input query, where the GPU memory stores multiple sets of model parameters.

In some examples, the first input query is associated with a first category identification that indicates the first set of model parameters that are obtained by training a plurality of first training data associated with the first category.

In some examples, the GPU memory may store the multiple sets of model parameters associated with multiple categories which includes the first category.

In some examples, the multiple sets of model parameters may be obtained by training a plurality of training data associated with the multiple categories.

In some examples, the graphic processing engine may access the first set of model parameters from the GPU memory based on the first category identification and infer the first output for the first input query based on the first set of model parameters that are obtained from the GPU memory.

In some examples, the graphic processing engine may pre-define a mapping between the first category identification and a first physical region in the GPU memory, where the mapping may be included in a compute kernel that is executed on the graphic processing engine. For example, the mapping may be an address mapping between one of the input query fields, e.g., category identification, and CUDA memory address.

Furthermore, the graphic processing engine may obtain a first offset based on the first category identification and a first layer index of the compute kernel, obtain a first physical location in the first physical region based on the first offset, and directly access the first set of model parameters based on the first physical location in the GPU memory. In some examples, the first physical region may be a physical address or a physical allocated region in the memory.

In some examples, the graphic processing engine may obtain multiple sets of compressed model parameters by compressing the multiple sets of model parameters associated with the multiple categories and store the multiple sets of compressed model parameters in the GPU memory. In some examples, the graphic processing engine may quantize and compress the multiple sets of model parameters using mix-precision quantization.

In step 603, the graphic processing engine may infer a first output for the first input query based on the first set of model parameters.

In some examples, the graphic processing engine may further receive a second input query associated with a second category, where the second input query may include a second category identification that indicates a second set of parameters that are obtained by training a plurality of second training data associated with the second category. Furthermore, the graphic processing engine may access the second set of parameters from the GPU memory based on the second category identification to switch the graphic processing engine from the first set of model parameters to the second set of model parameters, where the multiple categories further includes the second category. Moreover, the graphic processing engine may infer a second output for the second input query based on the second set of model parameters that may be obtained from the GPU memory.

In some examples, the mapping may further include the second category identification and a second physical region in the GPU memory. Furthermore, the graphic processing engine may further obtain a second offset based on the second category identification and a second layer index of the compute kernel, obtain a second physical location in the second physical region based on the second offset, and directly access the second set of model parameters based on the second physical location in the GPU memory. In some examples, the second physical region may be a physical address or a physical allocated region in the memory.

In some examples, as the custom kernels in the model engine 301 may receive multiple input queries, the second input query may be an input query after the first input query and associated with the second category which leads to the second set of model parameter, e.g., model weights #2 shown in FIG. 3.

In some examples, there is provided an apparatus for processing data. The apparatus includes the one or more processors 520 and a memory 540 configured to store instructions executable by the one or more processors. Further, the one or more processors, upon execution of the instructions, are configured to perform a method as illustrated in FIG. 6.

In some other examples, there is provided a non-transitory computer readable storage medium, having instructions stored therein. When the instructions are executed by the one or more processors 520, the instructions cause the one or more processors 520 to perform a method as illustrated in FIG. 6.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only.

It will be appreciated that the present disclosure is not limited to the exact examples described above and illustrated in the accompanying drawings, and that various modifications and changes can be made without departing from the scope thereof.

What is claimed is:

1. A method for processing data in a multi-model single-engine (MMSE) system, comprising:

receiving, by a graphic processing engine in the MMSE system, a first input query, wherein the first input query is associated with a first category identification;

obtaining, by the graphic processing engine in the MMSE system, a first set of model parameters by switching between multiple sets of model parameters based on the first input query, wherein obtaining the first set of model parameters comprises accessing, by the graphic processing engine in the MMSE system, the first set of model parameters from a graphic processing unit (GPU) memory in the graphic processing engine based on the first category identification, wherein the GPU memory stores the multiple sets of model parameters associated with multiple categories comprising a first category; and inferring, by the graphic processing engine in the MMSE system, a first output for the first input query based on the first set of model parameters;

and wherein accessing the first set of model parameters comprises:

pre-defining a mapping between the first category identification and a first physical region in the GPU memory, wherein the mapping is included in a compute kernel that is executed on the graphic processing engine;

obtaining a first offset based on the first category identification and a first layer index of the compute kernel;

obtaining a first physical location in the first physical region based on the first offset; and directly accessing the first set of model parameters based on the first physical location in the GPU memory.

2. The method of claim 1, further comprising:

accessing, by the graphic processing engine in the MMSE system, the first set of model parameters from the GPU memory in the graphic processing engine based on the first input query, wherein the GPU memory stores the multiple sets of model parameters.

3. The method of claim 2, wherein the first input query is associated with a first category identification that indicates the first set of model parameters that are obtained by training a plurality of first training data associated with the first category, wherein the GPU memory stores the multiple sets of model parameters associated with multiple categories comprising the first category, and wherein the multiple sets of model parameters are obtained by training a plurality of training data associated with the multiple categories, and wherein the method further comprises:

accessing, by the graphic processing engine in the MMSE system, the first set of model parameters from the GPU memory based on the first category identification; and inferring, by the graphic processing engine in the MMSE system, the first output for the first input query based on the first set of model parameters that are obtained from the GPU memory.

4. The method of claim 3, further comprising:

receiving, by the graphic processing engine, a second input query associated with a second category, wherein the second input query comprises a second category identification that indicates a second set of model parameters that are obtained by training a plurality of second training data associated with the second category;

accessing, by the graphic processing engine, the second set of model parameters from the GPU memory based on the second category identification to switch the graphic processing engine from the first set of model parameters to the second set of model parameters, wherein the multiple categories further comprise the second category; and inferring, by the graphic processing engine, a second output for the second input query based on the second set of model parameters that are obtained from the GPU memory.

5. The method of claim 4, wherein the mapping further comprises the second category identification and a second physical region in the GPU memory, and wherein accessing the second set of model parameters from the GPU memory based on the second category identification comprises:

obtaining a second offset based on the second category identification and a second layer index of the compute kernel;

obtaining a second physical location in the second physical region based on the second offset; and directly accessing the second set of model parameters based on the second physical location in the GPU memory.

6. The method of claim 1, further comprising:

obtaining, by the graphic processing engine in the MMSE system, multiple sets of compressed model parameters by compressing the multiple sets of model parameters; and storing, by the graphic processing engine in the MMSE system, the multiple sets of compressed model parameters in the GPU memory.

7. The method of claim 6, wherein compressing the multiple sets of model parameters associated with the multiple categories comprises:

quantizing and compressing the multiple sets of model parameters using mix-precision quantization.

8. An apparatus for processing data, comprising:

one or more processors; and a memory coupled to the one or more processors and configured to store instructions executable by the one or more processors, wherein the one or more processors, upon execution of the instructions, are configured to perform acts comprising:

receiving, by a graphic processing engine in the one or more processors, a first input query, wherein the first input query is associated with a first category identification;

obtaining, by the graphic processing engine, a first set of model parameters by switching between multiple sets of model parameters based on the first input query, wherein obtaining the first set of model parameters comprises accessing, by the graphic processing engine in the MMSE system, the first set of model parameters from a graphic processing unit (GPU) memory in the graphic processing engine based on the first category identification, wherein the GPU memory stores the multiple sets of model parameters associated with multiple categories comprising a first category; and inferring, by the graphic processing engine, a first output for the first input query based on the first set of model parameters;

and wherein accessing the first set of model parameters comprises:

pre-defining a mapping between the first category identification and a first physical region in the GPU memory, wherein the mapping is included in a compute kernel that is executed on the graphic processing engine;

obtaining a first offset based on the first category identification and a first layer index of the compute kernel;

obtaining a first physical location in the first physical region based on the first offset; and directly accessing the first set of model parameters based on the first physical location in the GPU memory.

9. The apparatus of claim 8, wherein the one or more processors are configured to perform acts further comprising:

accessing, by the graphic processing engine, the first set of model parameters from the GPU memory in the graphic processing engine based on the first input query, wherein the GPU memory stores the multiple sets of model parameters.

10. The apparatus of claim 9, wherein the first input query is associated with a first category identification that indicates the first set of model parameters that are obtained by training a plurality of first training data associated with the first category, wherein the GPU memory stores the multiple sets of model parameters associated with multiple categories comprising the first category, and wherein the multiple sets of model parameters are obtained by training a plurality of training data associated with the multiple categories, and wherein the one or more processors are configured to perform acts further comprising:

accessing, by the graphic processing engine, the first set of model parameters from the GPU memory based on the first category identification; and inferring, by the graphic processing engines, the first output for the first input query based on the first set of model parameters that are obtained from the GPU memory.

11. The apparatus of claim 10, wherein the one or more processors are configured to perform acts further comprising:

receiving, by the graphic processing engine, a second input query associated with a second category, wherein the second input query comprises a second category identification that indicates a second set of model parameters that are obtained by training a plurality of second training data associated with the second category;

accessing, by the graphic processing engine, the second set of model parameters from the GPU memory based on the second category identification to switch the graphic processing engine from the first set of model parameters to the second set of model parameters, wherein the multiple categories further comprise the second category; and inferring, by the graphic processing engine, a second output for the second input query based on the second set of model parameters that are obtained from the GPU memory.

12. The apparatus of claim 11, wherein the mapping further comprises the second category identification and a second physical region in the GPU memory, and wherein accessing the second set of model parameters from the GPU memory based on the second category identification comprises:

obtaining a second offset based on the second category identification and a second layer index of the compute kernel;

obtaining a second physical location in the second physical region based on the second offset; and directly accessing the second set of model parameters based on the second physical location in the GPU memory.

13. The apparatus of claim 8, wherein the one or more processors are configured to perform acts further comprising:

obtaining, by the graphic processing engine, multiple sets of compressed model parameters by compressing the multiple sets of model parameters; and storing, by the graphic processing engine, the multiple sets of compressed model parameters in the GPU memory.

14. The apparatus of claim 13, wherein compressing the multiple sets of model parameters associated with the multiple categories comprises:

quantizing and compressing the multiple sets of model parameters using mix-precision quantization.

15. A non-transitory computer-readable storage medium storing computer-executable instructions that, when executed by one or more computer processors, cause the one or more computer processors to perform acts comprising:

receiving, by a graphic processing engine in the one or more processors, a first input query, wherein the first input query is associated with a first category identification;

obtaining, by the graphic processing engine, a first set of model parameters by switching between multiple sets of model parameters based on the first input query, wherein obtaining the first set of model parameters comprises accessing, by the graphic processing engine in the MMSE system, the first set of model parameters from a graphic processing unit (GPU) memory in the graphic processing engine based on the first category identification; and inferring, by the graphic processing engine, a first output for the first input query based on the first set of model parameters;

and wherein the GPU memory stores the multiple sets of model parameters associated with multiple categories comprising a first category, and wherein accessing the first set of model parameters comprises:

pre-defining a mapping between the first category identification and a first physical region in the GPU memory, wherein the mapping is included in a compute kernel that is executed on the graphic processing engine;

obtaining a first offset based on the first category identification and a first layer index of the compute kernel;

obtaining a first physical location in the first physical region based on the first offset; and directly accessing the first set of model parameters based on the first physical location in the GPU memory.

16. The non-transitory computer-readable storage medium of claim 15, wherein the one or more processors are caused to perform acts further comprising:

accessing, by the graphic processing engine, the first set of model parameters from the GPU memory in the graphic processing engine based on the first input query, wherein the GPU memory stores the multiple sets of model parameters.

17. The non-transitory computer-readable storage medium of claim 15, wherein the first input query is associated with a first category identification that indicates the first set of model parameters that are obtained by training a plurality of first training data associated with the first category, wherein the GPU memory stores the multiple sets of model parameters associated with multiple categories comprising the first category, and wherein the multiple sets of model parameters are obtained by training a plurality of training data associated with the multiple categories, and wherein the one or more processors are caused to perform acts further comprising:

accessing, by the graphic processing engine, the first set of model parameters from the GPU memory based on the first category identification; and inferring, by the graphic processing engine, the first output for the first input query based on the first set of model parameters that are obtained from the GPU memory.

18. The non-transitory computer-readable storage medium of claim 15, wherein the one or more processors are caused to perform acts further comprising:

obtaining, by the graphic processing engine, multiple sets of compressed model parameters by compressing the multiple sets of model parameters; and storing, by the graphic processing engine, the multiple sets of compressed model parameters in the GPU memory.

19. The non-transitory computer-readable storage medium of claim 18, wherein compressing the multiple sets of model parameters associated with the multiple categories comprises:

quantizing and compressing the multiple sets of model parameters using mix-precision quantization.

20. The non-transitory computer-readable storage medium of claim 15, wherein the one or more processors are configured to perform acts further comprising:

receiving, by the graphic processing engine, a second input query associated with a second category, wherein the second input query comprises a second category identification that indicates a second set of model parameters that are obtained by training a plurality of second training data associated with the second category;

accessing, by the graphic processing engine, the second set of model parameters from the GPU memory based on the second category identification to switch the graphic processing engine from the first set of model parameters to the second set of model parameters, wherein the multiple categories further comprise the second category; and inferring, by the graphic processing engine, a second output for the second input query based on the second set of model parameters that are obtained from the GPU memory.

* * * * *